Patented July 28, 1936

2,049,207

UNITED STATES PATENT OFFICE 2,049,207

ESTERS FROM HALOGENATED PARAFFINS

Walter E. Lawson, Woodbury, N. J., assignor to E. I. du Pont de Nemours & Company, Wilmington, Del., a corporation of Delaware No Drawing. Application March 13, 1934, Serial No. 715,377

9 Claims. (Cl. 260—106)

This invention relates to new compositions of matter, and more particularly to new compositions of matter comprising esters and ethers derived from paraffin wax.

This invention has as an object the preparation of new esters from paraffin wax. A further object of this invention is the preparation of alkyl ethers from paraffin wax. Still further objects will appear hereinafter.

These objects are accomplished by the following invention, wherein a halogenated paraffin wax is reacted with a metal salt or alcoholate whereby there are formed esters and alkyl ethers of paraffin wax.

The following description of the invention is not to be regarded in any sense as limitative, but merely as illustrative.

A commercial grade of paraffin wax was fractionally distilled and a hydrocarbon isolated which boiled 210° to 240° C. at 3 mm. and melted 49° to 53° C. This product contained a hydrocarbon of the formula $C_{24}H_{50}$. Chlorination was readily effected in the presence of diffused sunlight or its equivalent by introducing chlorine through an efficient stirrer into the molten paraffin wax maintained at 55° to 60° C.

When the increase in weight indicated the introduction of slightly more than one atom of chlorine per molecule of paraffin wax, the product was dissolved in benzene, washed first with cold dilute sodium carbonate solution and finally with water to insure removal of dissolved chlorine and hydrogen chloride. The chlorinated paraffin was dried by distilling off the benzene and water. Chlorine analysis of the dried wax indicated the introduction of approximately one atom of chlorine per molecule of hydrocarbon. Typical ester and ether derivatives of the paraffin wax hydrocarbons were prepared from the chlorinated paraffin wax by the procedures disclosed in the following examples:

Example 1

Thirty-seven parts by weight of monochlorparaffin and 10 parts by weight of potassium acetate were added to 50 parts by weight of glacial acetic acid and the mixture heated under a reflux for 40 hours at 130° C. The waxy product was dissolved in benzol and extracted with water. The benzol was distilled off and the waxy residue was then distilled. Five and five tenths parts by weight of waxy material boiling 240° to 260° C. at 1 mm. was isolated which analysis indicated to be the acetate.

Example 2

Thirty-two and two-tenths parts by weight of postassium stearate dissolved in 100 parts by weight of butyl alcohol was added to 37 parts by weight of monochlorinated paraffin wax and 9.5 part by weight of sodium iodide and the mixture heated at 120° C. for 100 hours. The reaction mixture was filtered hot to remove the inorganic material which had separated and the filtrate was then evaporated to dryness, removing the last trace of the solvent by heating in a vacuum oven at 75° C. The solidifying temperature of the yellow colored product was 31° to 34° C. and analysis indicated the product to be the stearate.

Example 3

Three hundred twenty-two parts by weight of potassium stearate was mixed with 186 parts by weight of mono-chlorinated paraffin wax and two parts by weight of sodium iodide and heated at 200° C. for 48 hours. The product was dissolved in benzene and thoroughly washed with hot water to remove the inorganic salts. The benzene solution was next boiled with charcoal, filtered, and the solvent removed by heating under vacuum. The stearic acid ester, which analysis indicated to be substantially pure, was obtained in 97% yield.

Example 4

A dodecyl paraffin wax ether is obtained by reacting sodium dodecylate with chlorinated paraffin.

Sodium dodecylate is prepared by adding 74.4 parts by weight of dodecyl alcohol to 100 parts by weight of dry xylene and then slowly adding with stirring a suspension of 9.2 parts by weight of sodium in 83 parts by weight of xylene. After cooling to room temperature the paste which forms is thinned by the addition of xylene. To this solution is added 148.8 parts by weight of chlorinated paraffin wax and 9 parts by weight of dibutylamine and the mixture heated under a reflux for 48 hours. On cooling, the xylene solution is washed thoroughly with warm water and the solvent removed by heating under vacuum. The dodecyl paraffin wax ether is a soft, yellow colored waxy material.

The conditions disclosed in the examples above given are merely illustrative. If desired, temperatures even above 200° C. may be used or pressures in excess of atmospheric may be employed. While only sodium and potassium salts and alcoholates have been disclosed as intermediates, corresponding derivatives of other metals such as calcium, barium, silver, lead, and copper may be employed. In general, however, it is preferred to operate with the alkali metal salts. The condensations may be carried out without any catalyst or with catalysts other than those disclosed, such as sodium acetate, sodium bromide, potassium iodide, potassium bromide, etc. for the esters; diethyl amine, piperidine, pyridine, triethanolamine, etc. for the ethers.

The alkali metal salts used in making these esters may be derived from such acids as acetic, oleic, levulinic, lactic stearic, benzoic, α-naphthoic, phenylacetic, toluic, nitrobenzoic, naphthenic, etc. The acid may be saturated, unsaturated, aliphatic, aromatic, cycloaliphatic, etc. The alcoholates of saturated aliphatic alcohols such as methyl, ethyl, butyl, dodecyl, and octadecyl; of unsaturated aliphatic alcohols such as crotyl, 9, 10-octadecenyl, ricinoleyl, and linolyl; of aromatic alcohols (not phenols) such as benzyl, tolyl, and betaphenylethyl; and of alicyclic alcohols such as cyclohexyl, methylcyclohexyl, naphthenyl, abietyl, dihydroabietyl, and tetrahydroabietyl, may also be used. Alcoholates of dihydric and polyhydric alcohols, such as glycerol, polyglycerol, pentaerythritol, mannitol, ethylene glycol, butylene glycol, diethylene glycol, polyglycols generally, octadecanediol, glucose, sugars generally, starch, and cellulose, may be employed. Alcoholates of ether-alcohols such as methoxyethanol, methoxypropanol, dodecyloxyethanol, methoxyethoxy-ethanol, and of ester-alcohols such as ethyl lactate and castor oil are also suitable.

A large number of the intermediates for combination with the paraffin wax may be expressed comprehensively by the general formula $(RO)_xM$, where M is a metal, preferably univalent, $x$ is an integer equal to the valence of M, and R is an alkyl (i. e. a saturated open-chain monovalent radical), alkenyl (i. e. an unsaturated, open-chain, monovalent radical), aralkyl, acyl, or an alicyclic radical.

The products of this invention can be defined comprehensively by the formula $P(OR)_n$ where P is the paraffin wax residue, R is defined as in the preceding paragraph, and $n$ is an integer equal to the number of chlorine atoms per mol in the chlorinated paraffin intermediate.

The chlorinated paraffin wax employed may contain any desired number of chlorine atoms. Thus, the monochloro, the dichloro, trichloro, tetrachloro, etc., derivatives may be employed, although the mono-substituted derivative is preferred. Paraffin wax is considered to be a mixture of aliphatic hydrocarbons containing from about 16 to about 40 carbon atoms. In place of the chlorinated paraffin wax, the corresponding brominated, iodinated, or mixed halogenated paraffin wax may be employed. Paraffin waxes of various melting points may be used.

The novel esters and ethers of the present invention are useful as plasticizing agents in coating compositions and plastics, as impregnating agents and penetrating agents for fibrous materials such as paper, cloth, wood, and the like. They may be used with nitrocellulose, ethyl cellulose, or cellulose acetate to form compositions useful in making films, sheets, rods and molded articles. They impart desirable properties to ointments, creams, cosmetics, soaps, lubricating and boring oils, textile finishing agents, leather dressings, or neat's-foot oil substitutes. They may be employed in rubber compositions as softeners and pigment dispersing agents, and are valuable components of polishes for leather, wood, or metal. The mixture of esters has a lower melting point than the pure individual esters have and hence, is of greater utility in the formation of coating compositions. Because of the lower melting point, there is less tendency for the plasticizing ester to exude from the film.

Both acids and alcohols are included within the scope of the term "organic hydroxyl compound" used in the specification and claims.

The above description and examples are intended to be illustrative only. Any modification of or variation therefrom which conforms to the spirit of the invention is intended to be included within the scope of the claims.

I claim:

1. A process which comprises reacting a halogenated paraffin wax with a salt of a carboxylic acid.

2. A process which comprises reacting a halogenated paraffin wax with an alkali metal salt of a monocarboxylic acid.

3. A process which comprises reacting a halogenated paraffin wax with potassium acetate.

4. A process which comprises chlorinating paraffin wax until at least one atom of chlorine per unit weight corresponding to the average molecular weight of the hydro-carbons in the paraffin wax has been introduced and thereafter reacting the chlorinated hydrocarbon with an alkali metal salt of a monocarboxylic acid.

5. The process of claim 4 wherein the alkali metal salt is potassium acetate.

6. The process of claim 4 wherein the reaction is accompanied by heating for 40 to 100 hours.

7. The process of claim 4 wherein sodium iodide is used as a catalyst.

8. A process which comprises chlorinating paraffin wax until at least one atom of chlorine per unit weight corresponding to the average molecular weight of the hydrocarbons in the paraffin wax has been introduced and thereafter heating the chlorinated hydrocarbon for 40 to 100 hours with an alkali metal acetate in the presence of sodium iodide.

9. A process which comprises chlorinating paraffin wax until at least one atom of chlorine per unit weight corresponding to the average molecular weight of the hydrocarbons in the paraffin wax has been introduced and thereafter heating the chlorinated hydrocarbon for 40 to 100 hours with an alkali metal stearate in the presence of sodium iodide.

WALTER E. LAWSON.